United States Patent
Moore et al.

(10) Patent No.: US 10,867,264 B2
(45) Date of Patent: Dec. 15, 2020

(54) METHODS AND SYSTEMS FOR ESTIMATING LAG TIMES IN A CLOUD COMPUTING INFRASTRUCTURE

(71) Applicant: Xerox Corporation, Norwalk, CT (US)

(72) Inventors: Lee Coy Moore, Penfield, NY (US); Barry Glynn Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1158 days.

(21) Appl. No.: 14/529,845

(22) Filed: Oct. 31, 2014

(65) Prior Publication Data

US 2016/0125332 A1 May 5, 2016

(51) Int. Cl.
*G06Q 10/06* (2012.01)

(52) U.S. Cl.
CPC . *G06Q 10/06312* (2013.01); *G06Q 10/06315* (2013.01)

(58) Field of Classification Search
CPC .. G06Q 10/06315; G06Q 50/01; H04L 47/70; H04L 47/805; H04L 47/822; H04L 12/5601; H04L 2012/5629; H04L 2012/5635; H04L 2012/5651; H04L 2012/5679; H04L 47/21; H04L 47/24; H04L 47/50; H04L 47/6225; H04L 47/623; H04L 47/6255; H04L 47/765; H04L 1/0007; H04L 1/0057; H04L 1/188; H04L 2012/5607; H04L 47/808; H04L 47/829
See application file for complete search history.

(56) References Cited

U.S. PATENT DOCUMENTS

| | | | | |
|---|---|---|---|---|
| 9,195,374 | B1* | 11/2015 | Meaney | G06F 3/0484 |
| 2004/0170150 | A1* | 9/2004 | Guo | H04W 74/0816 370/338 |
| 2009/0043628 | A1 | 2/2009 | Gombert | |
| 2012/0246638 | A1* | 9/2012 | He | G06F 9/45558 718/1 |
| 2013/0060933 | A1* | 3/2013 | Tung | H04L 41/50 709/224 |
| 2014/0229608 | A1* | 8/2014 | Bauer | H04L 41/142 709/224 |
| 2016/0071023 | A1* | 3/2016 | Eicher | G06N 5/025 706/12 |

OTHER PUBLICATIONS

Miller, Michael. "The Internet at Your Fingertips", Pengiun, published Sep. 1, 2009 p. 315.*

(Continued)

*Primary Examiner* — Jamie H Austin
(74) *Attorney, Agent, or Firm* — Fox Rothschild LLP

(57) ABSTRACT

A method of scheduling one or more virtual machines in a cloud computing infrastructure may include identifying, by a computing device, lag time data that has been collected over a period of time and that corresponds to one or more virtual machines in a cloud computing infrastructure, computing, by the computing device, a cumulative description of the identified lag time data, identifying a target performance level, determining, by the computing device, an estimated lag time that corresponds to the target performance level, and determining, by the computing device, whether to start a new virtual machine based, at least in part, on the estimated lag time.

8 Claims, 7 Drawing Sheets

(56) References Cited

OTHER PUBLICATIONS

Mao et al. Auto-scaling to minimize cost and meet application deadlines in cloud workflows. SC '11: Proceedings of 2011 International Conference for High Performance Computing, Networking, Storage and Analysis. Dec. 2011. p. 1-12. (Year: 2011).*

* cited by examiner

METHODS AND SYSTEMS FOR ESTIMATING LAG TIMES IN A CLOUD COMPUTING INFRASTRUCTURE

BACKGROUND

Cloud computing technologies provide numerous advantages for solution providers. As one example, clouds offer huge reserves of computing power on demand. A service request is usually made to the cloud and, after an interval of time, computing resources are available for use. Often, delivery of customer services is bound to service-level agreements (SLAs) that outline agreed upon service metrics. However, within a cloud-based service delivery model, satisfying SLAs is sometimes a challenge due to lag times in the delivery of virtual resources.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of scheduling one or more virtual machines in a cloud computing infrastructure may include identifying, by a computing device, lag time data that has been collected over a period of time and that corresponds to one or more virtual machines in a cloud computing infrastructure, computing, by the computing device, a cumulative description of the identified lag time data, identifying a target performance level, determining, by the computing device, an estimated lag time that corresponds to the target performance level, and determining, by the computing device, whether to start a new virtual machine based, at least in part, on the estimated lag time.

In an embodiment, a system for scheduling one or more virtual machines in a cloud computing infrastructure may include a computing device and a computer-readable storage medium in communication with the computing device. The computer-readable storage medium may include one or more programming instructions that, when executed, cause the computing device to identify lag time data that has been collected over a period of time and that corresponds to one or more virtual machines in a cloud computing infrastructure, compute a cumulative description of the identified lag time data, identify a target performance level, determine an estimated lag time that corresponds to the target performance level, an determine whether to start a new virtual machine based, at least in part, on the estimated lag time.

DETAILED DESCRIPTION

Figure 1:
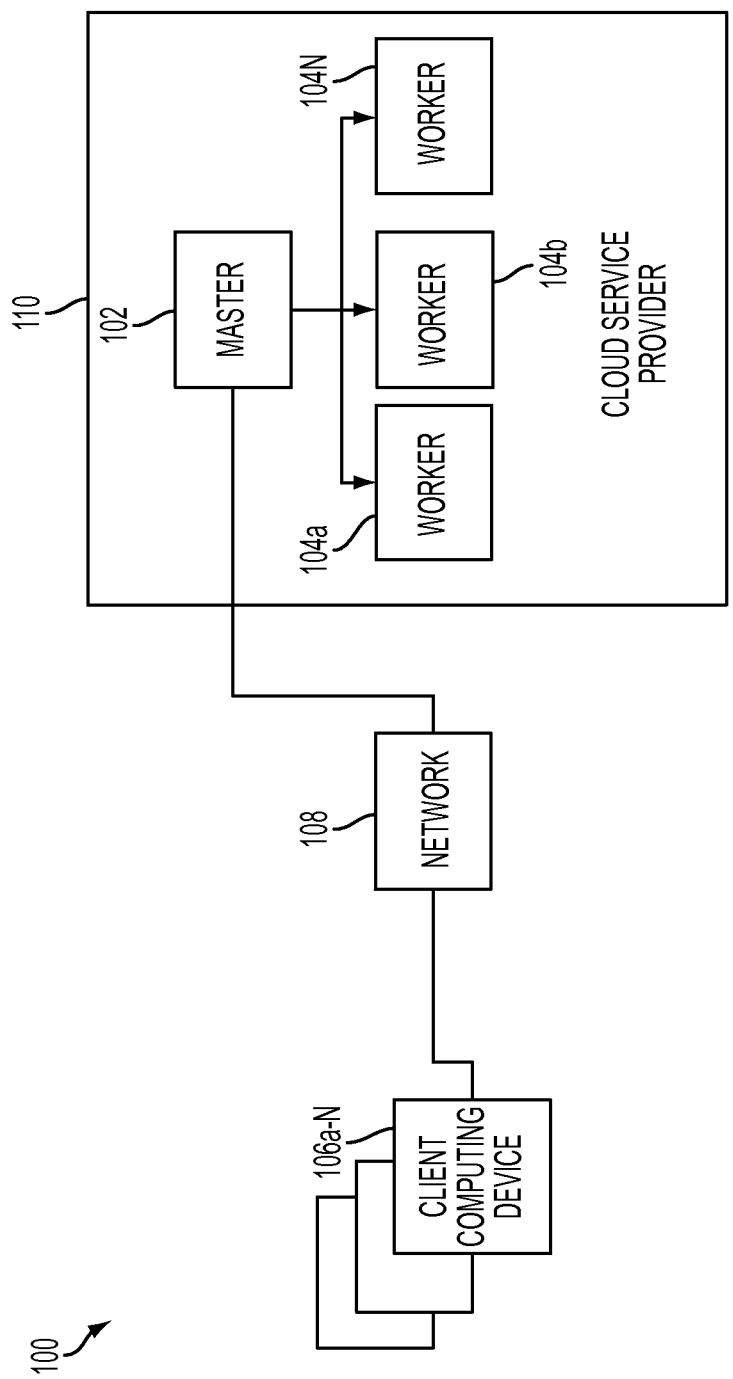
FIG. 1 illustrates an example cloud computing architecture according to an embodiment.

The following terms shall have, for purposes of this application, the respective meanings set forth below:

A "cloud service provider" refers to a service provider that offers one or more cloud computing services such as, for example, infrastructure as a service (IaaS), software as a service (SaaS) or platform as a service (PaaS), to businesses, individuals or others via a network. In certain embodiments, a cloud service provider may perform at least a portion of the services using one or more virtual machines.

A "computing device" refers to a device that includes a processor and non-transitory, computer-readable memory. The memory may contain programming instructions that, when executed by the processor, cause the computing device to perform one or more operations according to the programming instructions. As used in this description, a "computing device" may be a single device, or any number of devices having one or more processors that communicate with each other and share data and/or instructions. Examples of computing devices include personal computers, servers, mainframes, gaming systems, televisions, and portable electronic devices such as smartphones, personal digital assistants, cameras, tablet computers, laptop computers, media players and the like.

A "job" refers to a logical unit of work that is to be completed or a task that is to be performed.

A "lag time" refers to an amount of time between when a request for a new virtual machine is made and the time that the virtual machine is ready to accept input.

In a cloud computing system which offers infrastructure-as-a-service, the IT infrastructure may be under software control. In certain cases, a complete virtual data center may be created, which may include one or more machines, networks, firewalls, network-attached storage (NAS), load balancers and/or the like. However, infrastructure components cannot be created instantly. A request may be made to a cloud computing controller and, after an interval of time, a new component may be made available for use. To create a predictable solution based on a cloud infrastructure, it is important to understand how long it takes to create a component and have it be available to perform work.

In an embodiment, a customer may engage a cloud service provider to process one or more jobs on its behalf. In certain embodiments, this processing may be governed by a service level agreement (SLA) between the customer and the cloud service provider. An SLA may include one or more measurable benchmarks relating to the processing. For instance, an SLA may specify that a service will be available a certain percentage of time. As another example, an SLA may specify that a job will be completed within a certain period of time at least 95% of the time. Additional and/or alternate benchmarks may be used within the scope of this disclosure.

To be cost-effective, cloud resources may only be requested when they are needed. However, this on-demand approach may incur lag time, especially if a cloud service provider needs to add a new virtual machine in order to process a job. It is important for a service provider to be able to account for the lag time in meeting one or more benchmarks of an SLA according to an embodiment.

Employing the use of historical lag times to estimate an amount of time needed to acquire a new resource, with a given level of certainty, may aid in the ability to manage resources in a more efficient and predictable manner. A job scheduler equipped with the ability to forecast job arrival rates and estimate how quickly it can service a job backlog can identify the need to acquire or release computer resources, but may lack the ability to know whether it is futile to request the resource. With the additional ability to estimate acquisition times for new resources, a job scheduler may better predict job backlog when the resource is available and ready to execute. If the backlog is completed with the current resources in the time it takes for a resource to be acquired, then there may be no reason to start another resource. Poorly timed requests for resources may trend a system toward compromising SLA and quality of service (QoS) metrics. By employing estimation of lag times, the acquisition of resources are provisioned in a disciplined manner and may reverse the trend toward SLA and QoS compromise, improving overall system cost and performance.

FIG. 1 illustrates an example cloud computing architecture according to an embodiment. As illustrated by FIG. 1, a system 100 may include a cloud service provider 110 and one or more client computing devices 106a-N in communication with the cloud provider.

A cloud service provider 110 may include a master 102, one or more workers 104a-N. A master 102 may be a computing device such as, for example, a server, a mainframe and/or the like. A master 102 may be in communication with one or more workers 104a-N. In certain embodiments, a master 102 may receive a job request from a client computing device 106a-N, and a master 102 may pass the request to one or more workers 104a-N to process the request. If a worker is not active, or if active workers are busy processing other requests, a master 102 may initiate one or more new workers 104a-N to process the job request. A master 102 may also initiate a bi-directional communications channel between itself and its workers 104a-N.

A worker 104a-N may be a virtual machine that is initiated by a master 102. As part of a start-up sequence, a worker 104a-N may boot its operating system, connect to a communication channel between it and its master 102, and send a notification to the master when it is ready to begin processing a job. As such, a master 102 knows when a worker 104a-N has started, when its operating system and all of its services are available, and that the worker is ready to accept work.

As illustrated by FIG. 1, a master 102 hosted by a cloud service provider 110 may be in communication with one or more client computing devices 106a-N via a network 108. A client computing device 106a-N may be a computing device associated with a customer. A customer may send one or more jobs to the master 102 via the network 108. In an embodiment, a network 108 may be a local area network (LAN), a wide area network (WAN), a mobile or cellular communication network, an extranet, an intranet, the Internet and/or the like.

Figure 2:
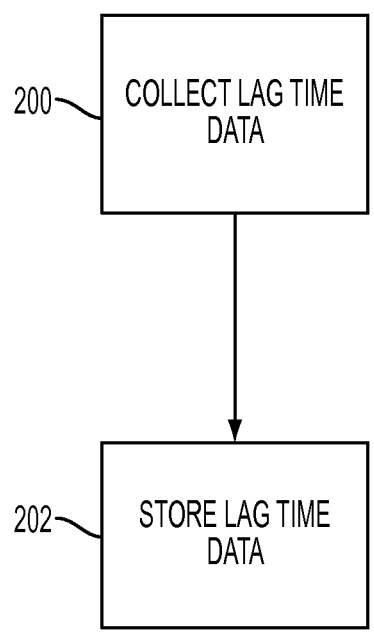
FIG. 2 illustrates a flow chart of an example method of collecting lag time data according to an embodiment.

FIG. 2 illustrates a flow chart of an example method of collecting lag time data according to an embodiment. As illustrated by FIG. 2, lag time data pertaining to one or more virtual machines may be collected 200. In an embodiment, lag time data may be collected 200 over a certain period of time and/or across one or more service requests. Lag time data may be collected 200 by determining a lag time associated with one or more virtual machines over a time period. For instance, a master may determine a time period between requesting initiation of a virtual machine and receiving a notification from the virtual machine that it is ready to accept input. In an embodiment, a master may collect 200 lag time data. In an alternate embodiment, one or more computing devices in communication with a master may collect 200 lag time data.

Figure 3:
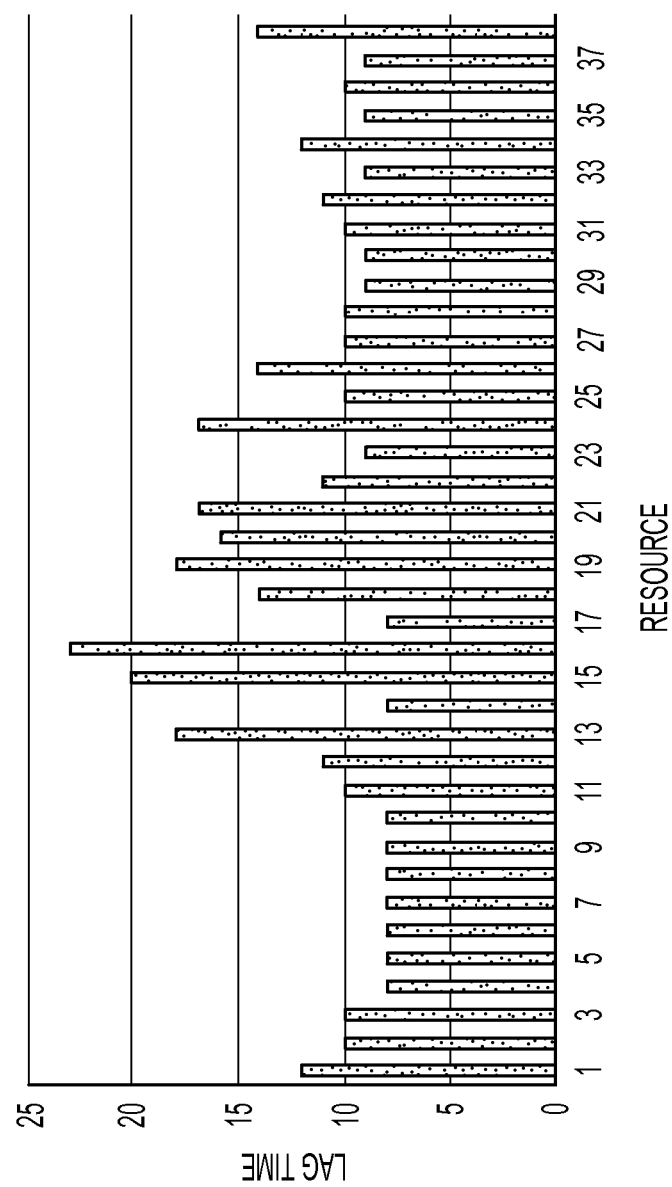
FIG. 3 illustrates example lag time data collected over a period of time according to an embodiment.
Figure 4:
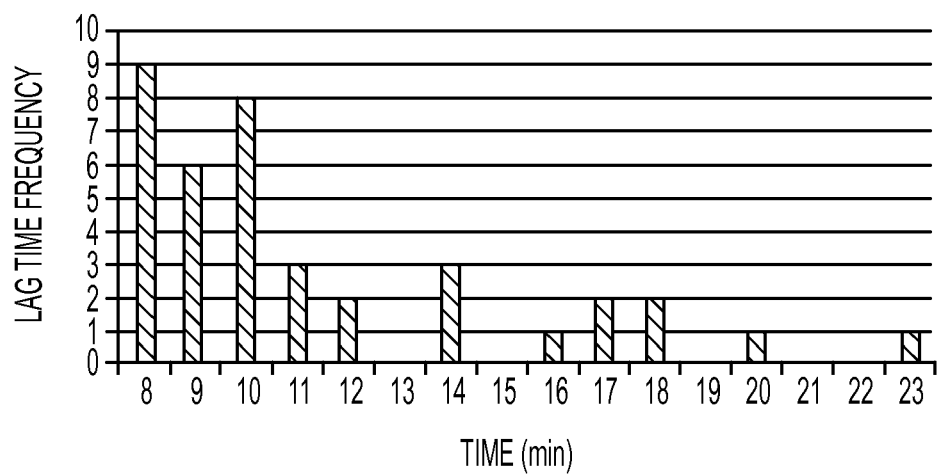
FIG. 4 illustrates lag time frequency data collected over a period of time according to an embodiment.

FIG. 3 illustrates example lag time data collected over a period of time according to an embodiment, and FIG. 4 illustrates example lag time frequencies of resources according to an embodiment. As illustrated by FIG. 3, a large degree of variation may exist in the lag times across virtual machines. For instance, the lag time associated with Virtual Machine 16 is approximately double the lag time associated with Virtual Machine 22.

In an embodiment, lag time data associated with one or more virtual machines may be stored 202. For instance, lag time data that is collected over a period of time and across one or more virtual machines may be stored 202 in a database, table, list or other data structure. In certain embodiments, collected lag time data may be stored 202 by a cloud service provider.

In certain embodiment, a cloud service provider may include a job scheduler. A job scheduler may be implemented as hardware, software or a combination of hardware and software. The job scheduler may receive one or more jobs from one or more customers, and may delegate the jobs. In certain embodiments, a job scheduler may determine whether to assign a received job to an already active virtual machine or to start a new virtual machine. In making this decision, a job scheduler may consider whether the lag time associated with starting a new virtual machine will impact an associated SLA, according to an embodiment.

Figure 5:
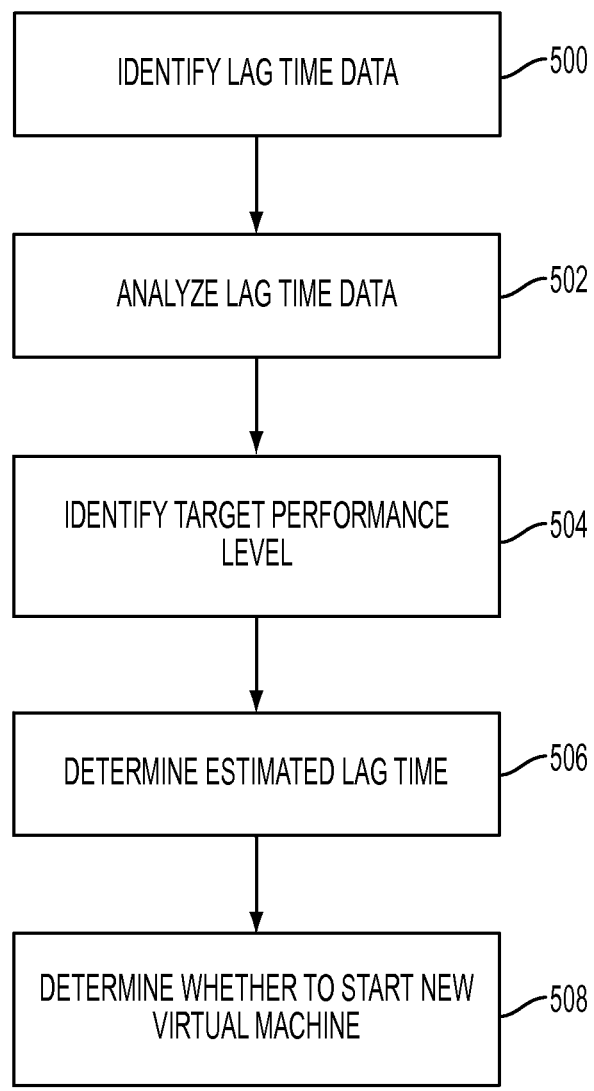
FIG. 5 illustrates a flow chart of an example method of scheduling one or more virtual machines according to an embodiment.

FIG. 5 illustrates a flow chart of an example method of scheduling one or more virtual machines according to an embodiment. As illustrated by FIG. 5, a job scheduler may identify 500 lag time data that has been collected over a period of time. A job scheduler may identify 500 lag time data that has been stored by the cloud computing provider. A job scheduler may identify 500 lag time data that is stored by the cloud computing provider over a certain period of time. For instance, a job scheduler may identify lag time data that has been stored by the cloud computing provider over the past 24 hours. Additional and/or alternate time periods may be used within the scope of this disclosure.

In an embodiment, the job scheduler may analyze 502 the identified lag time data. A job scheduler may analyze 502 identified lag time data by computing a cumulative depiction of the lag times according to an embodiment. A cumulative depiction may show cumulative lag time frequency for one or more lag times and also a cumulative percentage curve. A cumulative percentage curve may be obtained from the cumulative frequency of lag times within one or more intervals. In an embodiment, cumulative percentage may be represented as follows:

$$\text{cumulative percentage} = (\text{cumulative frequency}/\text{number of intervals}) \times 100$$

Figure 6:
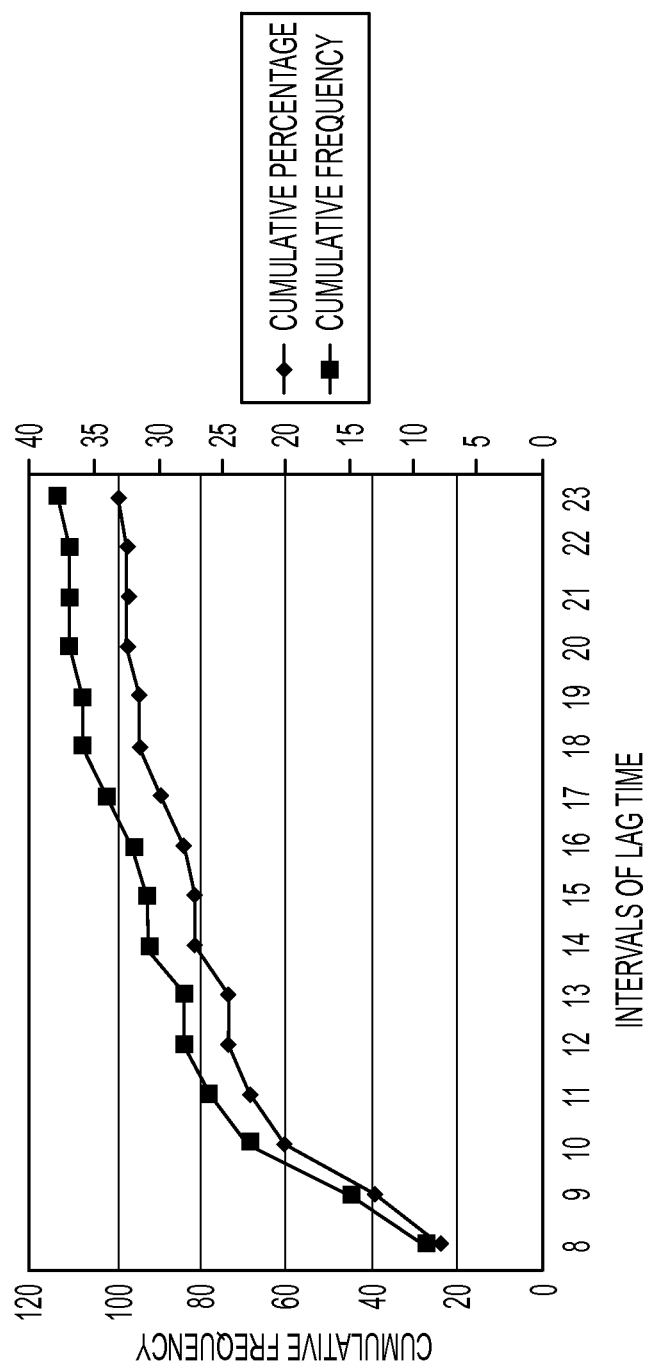
FIG. 6 illustrates an example cumulative depiction according to an embodiment.

FIG. 6 illustrates an example cumulative frequency depiction according to an embodiment. As illustrated by FIG. 6, the lag time frequency associated with identified lag time data may be represented as a plot where the x-axis of the plot may show intervals of lag times, while the y-axis may show the cumulative frequency with which one or more lag times are experienced in that interval. As shown by FIG. 6, a cumulative depiction may include a representation of a corresponding cumulative percentage curve. A cumulative percentage curve may represent a frequency distribution of the lag time data across one or more performance level intervals.

Referring back to FIG. 5, a job scheduler may identify 504 a target performance level according to an embodiment. A target performance level may be identified 504 based on an SLA or other agreement. For example, an SLA may specify that jobs are to be completed within five hours 95% of the time. In this example, 95% may be identified 504 as the target performance level.

In an embodiment, a job scheduler may determine 506 an estimated lag time for a target performance level according to an embodiment. A job scheduler may determine 506 an estimated lag time using the identified target performance level and the cumulative depiction. For instance, the job scheduler may identify an estimated lag time that corresponds to the target performance level on the cumulative percentage curve of the cumulative depiction. For instance, if 90% is identified as the target performance level, then an estimated lag time of approximately 17 minutes may be determined 506 since 90% corresponds to a lag time of 17 minutes on the cumulative percentage curve. As such, a job scheduler may determine that it should be able to start a virtual machine within 17 minutes 90% of the time. As another example, an estimated lag time of approximately 18.5 minutes may be determined 506 for a target performance level of 95%. As such, a job scheduler may determine that it should be able to start a virtual machine within 18.5 minutes 95% of the time. Additional and/or alternate lag times and/or target performance levels may be used within the scope of this disclosure.

A job scheduler may use the determined lag time to determine 508 whether to start a new virtual machine. A job scheduler may analyze current performance, estimated future performance and/or the determined lag time to determine whether starting a new virtual machine will violate a corresponding SLA.

Figure 7:
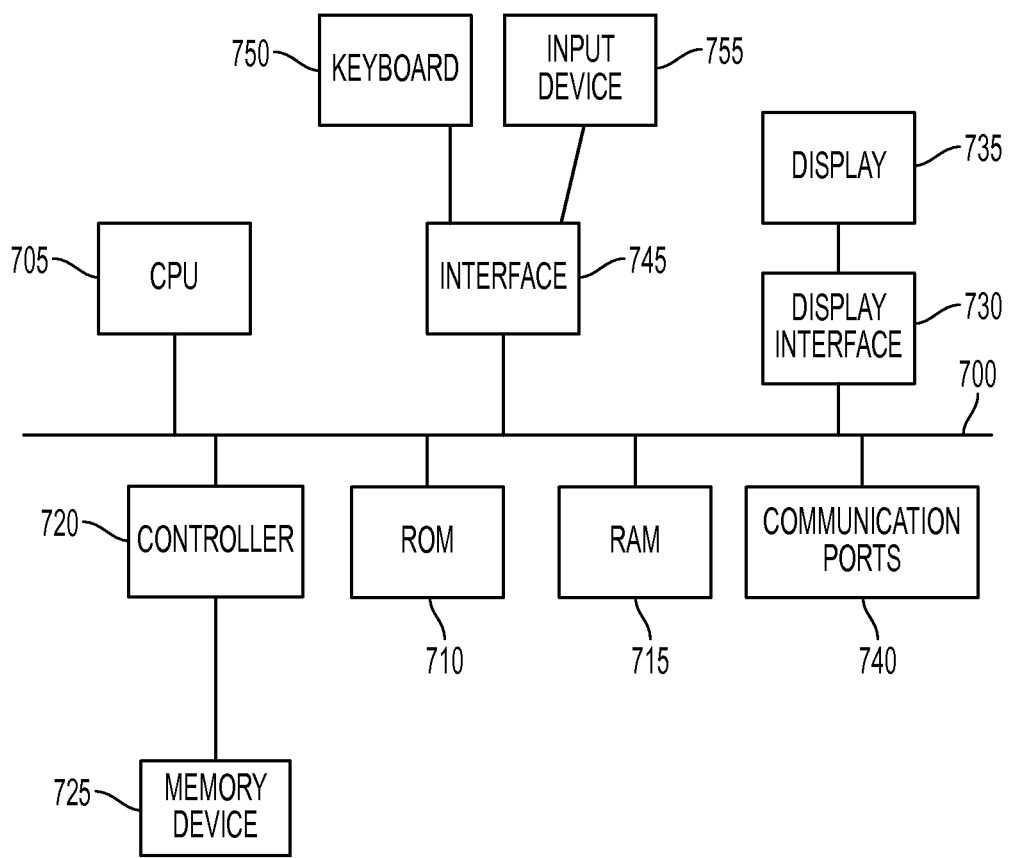
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of scheduling one or more virtual machines in a cloud computing infrastructure, the method comprising:

initiating a startup sequence by one or more virtual machines in a cloud computing infrastructure of a cloud service provider that are in communication with a job scheduler of the cloud service provider, wherein the startup sequence comprises connecting to a communication channel between the one or more virtual machines and the job scheduler and sending, by each of the one or more virtual machines, a notification to the job scheduler when it is ready to accept work;

receiving, by the job scheduler, a job request to be processed;

identifying, by the job scheduler, lag time data that has been collected over a period of time and that corresponds to one or more of the one or more virtual machines, wherein the lag time data comprises, for at least one of the one or more virtual machines, an amount of time between when a request for the at least one virtual machine is made and a time that the at least one virtual machine is ready to accept input;

computing, by the job scheduler, a cumulative depiction of the identified lag time data that comprises a cumulative lag time frequency for at least a portion of the lag time data and a cumulative percentage curve associated with the cumulative lag time frequency, wherein the cumulative percentage curve represents a percentage of a frequency distribution of the lag time data across one or more performance level intervals;

identifying a target performance level from a service level agreement, wherein the target performance level is included in one or more of the one or more performance level intervals;

using the cumulative percentage curve to determine, by the job scheduler, an estimated lag time that corresponds to the target performance level on the cumulative percentage curve, wherein the estimated lag time represents an estimated amount of time that it will take to start a new virtual machine; and determining, by the job scheduler, whether to start the new virtual machine based, at least in part, on the estimated lag time by determining whether the estimate lag time will impact the target performance level such as to violate the service level agreement.

2. The method of claim 1, wherein identifying the lag time data comprises identifying the lag time data from a database associated with the cloud computing infrastructure.

3. The method of claim 1, wherein computing the cumulative depiction comprises:
computing the cumulative lag time frequency; and
computing the cumulative percentage curve.

4. The method of claim 1, further comprising:
receiving lag time data from one or more of the at least one of the one or more virtual machines over the period of time; and
storing the lag time data in a database associated with the cloud provider infrastructure.

5. A system for scheduling one or more virtual machines in a cloud computing infrastructure, the system comprising:
a computing device associated with a cloud service provider;
one or more virtual machines in a cloud computing infrastructure of the cloud service provider that are in communication with the computing device, wherein the one or more virtual machines are configured to initiate a startup sequence by connecting to a communication channel between the one or more virtual machines and the computing device and sending a notification to the computing device when ready to accept work; and
a computer-readable storage medium in communication with the computing device, the computer-readable storage medium comprising one or more programming instructions that, when executed, cause the computing device to:
receive a job request to be processed,
identify lag time data that has been collected over a period of time and that corresponds to one or more of the one or more virtual machines, wherein the lag time data comprises, for at least one of the virtual machines, an amount of time between when a request for the at least one of the one or more virtual machine is made and a time that the at least one virtual machine is ready to accept input,
compute a cumulative depiction of the identified lag time data that comprises a cumulative lag time frequency for at least a portion of the lag time data and a cumulative percentage curve associated with the cumulative lag time frequency, wherein the cumulative percentage curve represents a percentage of a frequency distribution of the lag time data across one or more performance levels,
identify a target performance level from a service level agreement, wherein the target performance level is included in one or more of the one or more performance level intervals,
using the cumulative percentage curve to determine an estimated lag time that corresponds to the target performance level on the cumulative percentage curve, wherein the estimated lag time represents an estimated amount of time that it will take to start a new virtual machine, and
determine whether to start a new virtual machine based, at least in part, on the estimated lag time by determining whether the estimated lag time will impact the target performance level such as to violate the service level agreement.

6. The system of claim 5, wherein the one or more programming instructions that, when executed, cause the computing device to identify the lag time data comprise one or more programming instructions that, when executed, cause the computing device to identify the lag time data from a database associated with the cloud computing infrastructure.

7. The system of claim 5, wherein the one or more programming instructions that, when executed, cause the computing device to compute the cumulative depiction comprise one or more programming instructions that, when executed, cause the computing device to:
compute the cumulative lag time frequency; and
compute the cumulative percentage curve.

8. The system of claim 5, wherein the computer-readable storage medium further comprises one or more programming instructions that, when executed, cause the computing device to:
receive lag time data from one or more of the at least one of the one or more virtual machines over the period of time; and
store the lag time data in a database associated with the cloud provider infrastructure.

* * * * *